(12) United States Patent
Rahardjo et al.

(10) Patent No.: US 9,037,884 B2
(45) Date of Patent: May 19, 2015

(54) SYSTEM AND METHOD FOR MULTI-PHASE VOLTAGE REGULATION

(71) Applicant: Dell Products L.P., Round Rock, TX (US)

(72) Inventors: Johan Rahardjo, Austin, TX (US); John Breen, Harker Heights, TX (US); Shiguo Luo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/534,395

(22) Filed: Nov. 6, 2014

(65) Prior Publication Data

US 2015/0066234 A1    Mar. 5, 2015

Related U.S. Application Data

(63) Continuation of application No. 12/575,103, filed on Oct. 7, 2009, now Pat. No. 8,930,723.

(51) Int. Cl.
*G06F 1/26*     (2006.01)
*G06F 1/32*     (2006.01)
*G05F 1/66*     (2006.01)
*G05B 15/02*    (2006.01)

(52) U.S. Cl.
CPC G05F 1/66 (2013.01); G05B 15/02 (2013.01); *G06F 1/3203* (2013.01); *G06F 1/3209* (2013.01); *G06F 1/3287* (2013.01)

(58) Field of Classification Search
CPC ... G06F 1/3203; G06F 1/3209; G06F 1/3287; G06F 9/4418; H02M 2001/0032; Y02B 60/186
USPC ............... 713/300, 320, 323; 323/212, 234
See application file for complete search history.

(56) References Cited

U.S. PATENT DOCUMENTS

| | | | |
|---|---|---|---|
| 6,281,666 B1 | 8/2001 | Tressler et al. | 323/272 |
| 8,930,723 B2 * | 1/2015 | Rahardjo et al. | 713/300 |
| 2002/0135338 A1 | 9/2002 | Hobrecht et al. | 323/272 |
| 2008/0195884 A1 | 8/2008 | Subramanian et al. | 713/500 |
| 2008/0238390 A1 | 10/2008 | Trivedi et al. | 323/283 |

* cited by examiner

*Primary Examiner* — Michael J Brown
(74) *Attorney, Agent, or Firm* — Baker Botts L.L.P.

(57) ABSTRACT

In accordance with one embodiment of the present disclosure, a multi-phase voltage regulator may comprise a plurality of phases, each phase configured to supply electrical current to one or more information handling resources electrically coupled to the voltage regulator. A controller may be electrically coupled to the plurality of phases. The controller may designate at least one of the plurality of phases as a first state phase, and designate each of the plurality of phases not designated as a first state phase as a second state phase. The controller may alternate the designation of at least two of the plurality of phases between a first state phase and a second state phase. Each first state phase may be configured to supply a first electrical current regardless of electrical current demand. Each second state phase may be configured to supply a second electrical current based on the current demand.

17 Claims, 3 Drawing Sheets

SYSTEM AND METHOD FOR MULTI-PHASE VOLTAGE REGULATION

CROSS-REFERENCE TO RELATED APPLICATIONS

The present application is a continuation of U.S. patent application Ser. No. 12/575,103 filed Oct. 7, 2009; which is hereby incorporated by reference.

TECHNICAL FIELD

The present disclosure relates in general to power regulation in information handling systems, and more particularly to multi-phase voltage regulation.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often incorporate multi-phase voltage regulators to ensure that information handling resources are consistently supplied with necessary electrical current. Some traditional multi-phase voltage regulators utilize phase shedding, whereby unneeded phases are configured to cease supplying electrical current. Phase shedding occurs when electrical current demand decreases to a threshold level in which the multi-phase voltage regulator can disable a phase and still supply the necessary electrical current.

One problem with some traditional multi-phase voltage regulators is that the phases may shed in the same order. This can cause the phases to suffer operational stress disproportionately. The first phase to shed suffers less operational stress than every consecutive phase to shed, and, in many traditional regulators, one phase never sheds. The uneven distribution of operational stress wastes the resources of the voltage regulator. The last phase may fail due to accumulated operational stress while the first shed phase has suffered relatively little operational stress. The decreased operational lifespan of the last phase causes decreased operational lifetime for the voltage regulator.

Additionally, the longer a phase has been active, the higher its operational temperature. Higher operational temperature increases thermal resistance which causes increased power loss, and decreases the range of current that the voltage regulator can deliver. The increased temperature also raises the temperature of other system resources which negatively affects their performance. These faults cause overall system reliability to suffer.

SUMMARY

In accordance with the teachings of the present disclosure, disadvantages and problems associated with implementing multi-phase voltage regulators may be substantially reduced or eliminated.

In accordance with one embodiment of the present disclosure, a multi-phase voltage regulator may comprise a plurality of phases, each phase configured to supply electrical current to one or more information handling resources electrically coupled to the voltage regulator. A controller may be electrically coupled to the plurality of phases and configured to alternately designate each of the plurality of phases as one of a first state phase and a second state phase. The controller may designate at least one of the plurality of phases as a first state phase, and designate each of the plurality of phases not designated as a first state phase as a second state phase. The controller may alternate the designation of at least two of the plurality of phases between a first state phase and a second state phase. Each first state phase may be configured to supply a first electrical current to the one or more information handling resources regardless of a current demand of the one or more information handling resources. Each second state phase may be configured to supply a second electrical current to the one or more information handling resources based on the current demand.

In accordance with another embodiment of the present disclosure, an information handling system is described. An information handling system may comprise one or more information handling resources, and a multi-phase voltage regulator. The multi-phase voltage regulator may comprise a plurality of phases, each phase configured to supply electrical current to one or more information handling resources electrically coupled to the voltage regulator. A controller may be electrically coupled to the plurality of phases and configured to alternately designate each of the plurality of phases as one of a first state phase and a second state phase. The controller may designate at least one of the plurality of phases as a first state phase, and designate each of the plurality of phases not designated as a first state phase as a second state phase. The controller may alternate the designation of at least two of the plurality of phases between a first state phase and a second state phase. Each first state phase may be configured to supply a first electrical current to the one or more information handling resources regardless of a current demand of the one or more information handling resources. Each second state phase may be configured to supply a second electrical current to the one or more information handling resources based on the current demand.

In accordance with a further embodiment of the present disclosure, a method for regulating voltage is provided. The method may include electrically coupling one or more information handling resources to a multi-phase voltage regulator comprising a plurality of phases, each phase configured to supply electrical current to the one or more information handling resources. The method may further include electrically coupling the plurality of phases to a controller configured to alternately designate each of the plurality of phases as one of a first state phase and a second state phase. The method may further include configuring each first state phase to supply a first electrical current to the one or more information handling resources regardless of a current demand of the one or more information handling resources, and configuring each second state phase to supply a second electrical current to the one or more information handling resources based on the current demand. The method may further include designating at least one of the plurality of phases as a first state phase, designating each of the plurality of phases not designated as a first state phase as a second state phase, and alternating at least two of the plurality of phases between first and second state phase designations.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
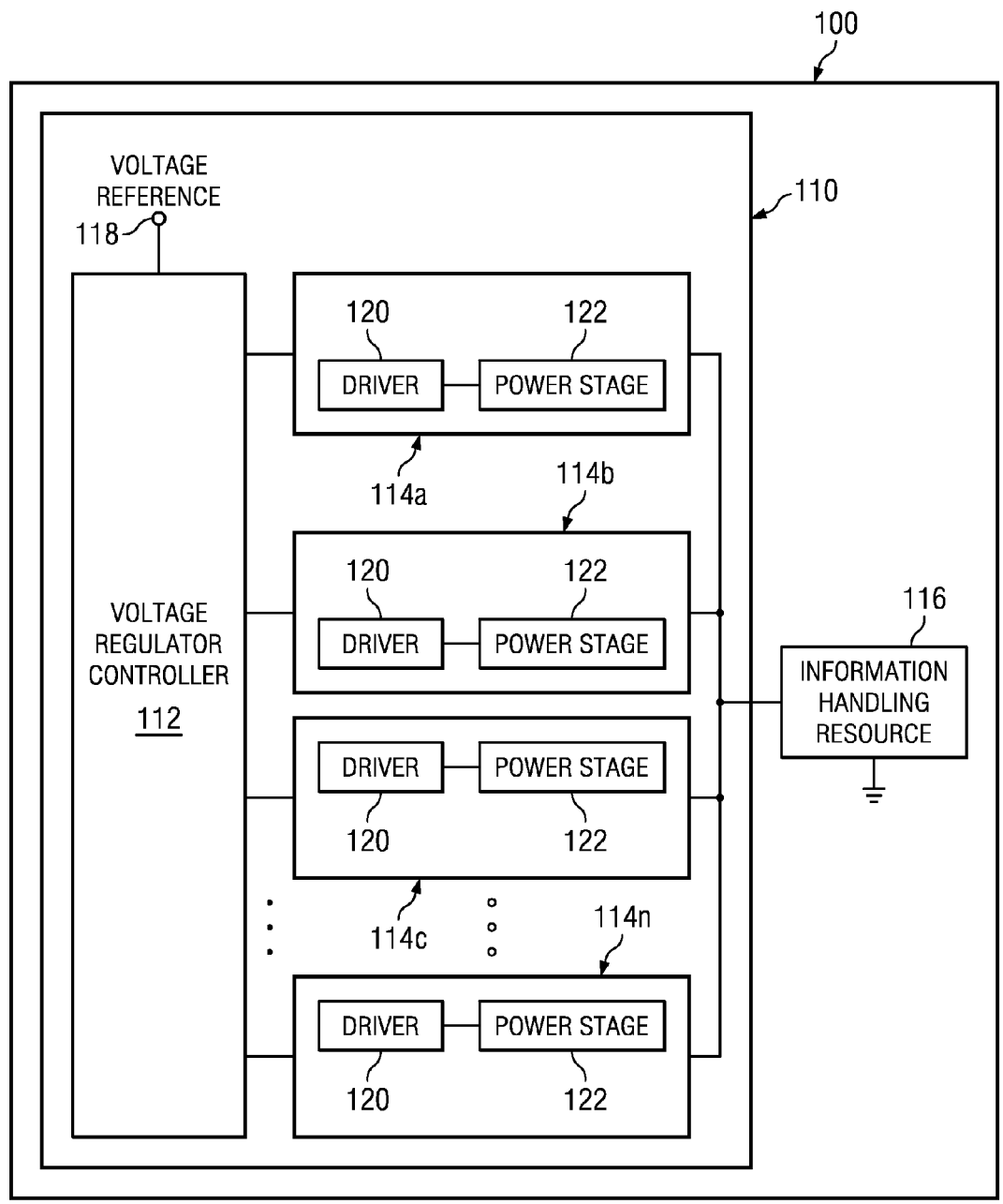
FIG. 1 illustrates a block diagram of an example of an information handling system, in accordance with embodiments of the present disclosure.
Figure 2:
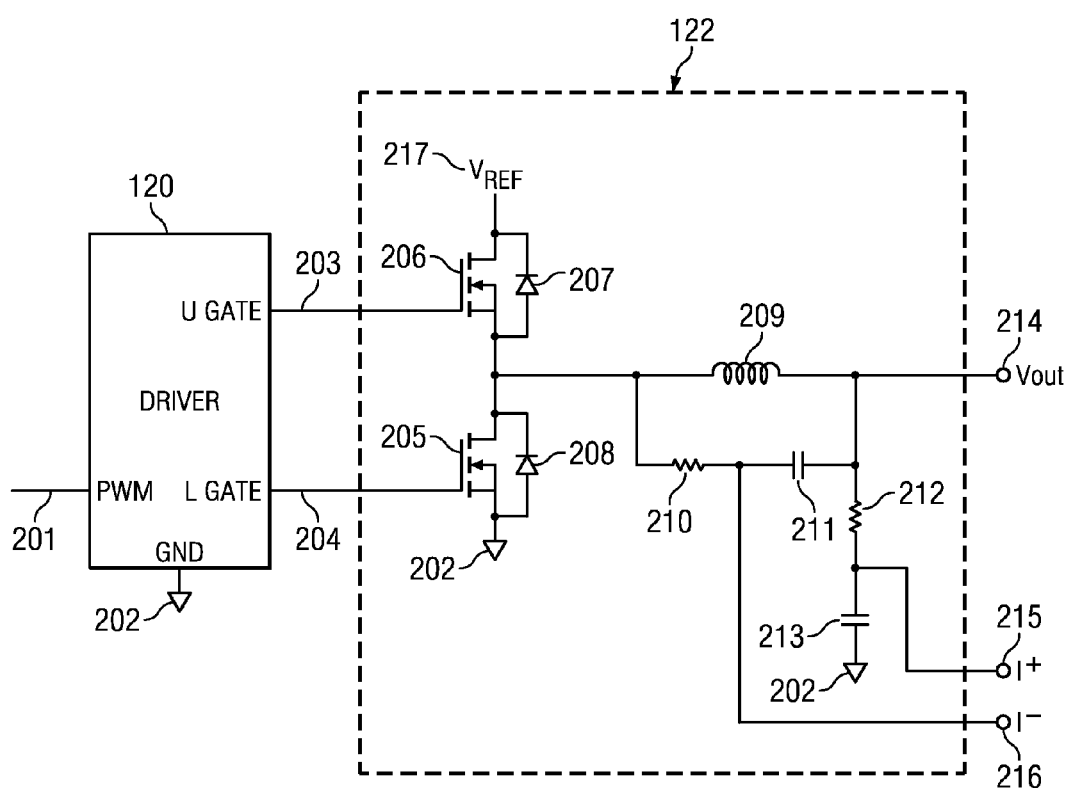
FIG. 2 illustrates an example of a phase.
Figure 3:
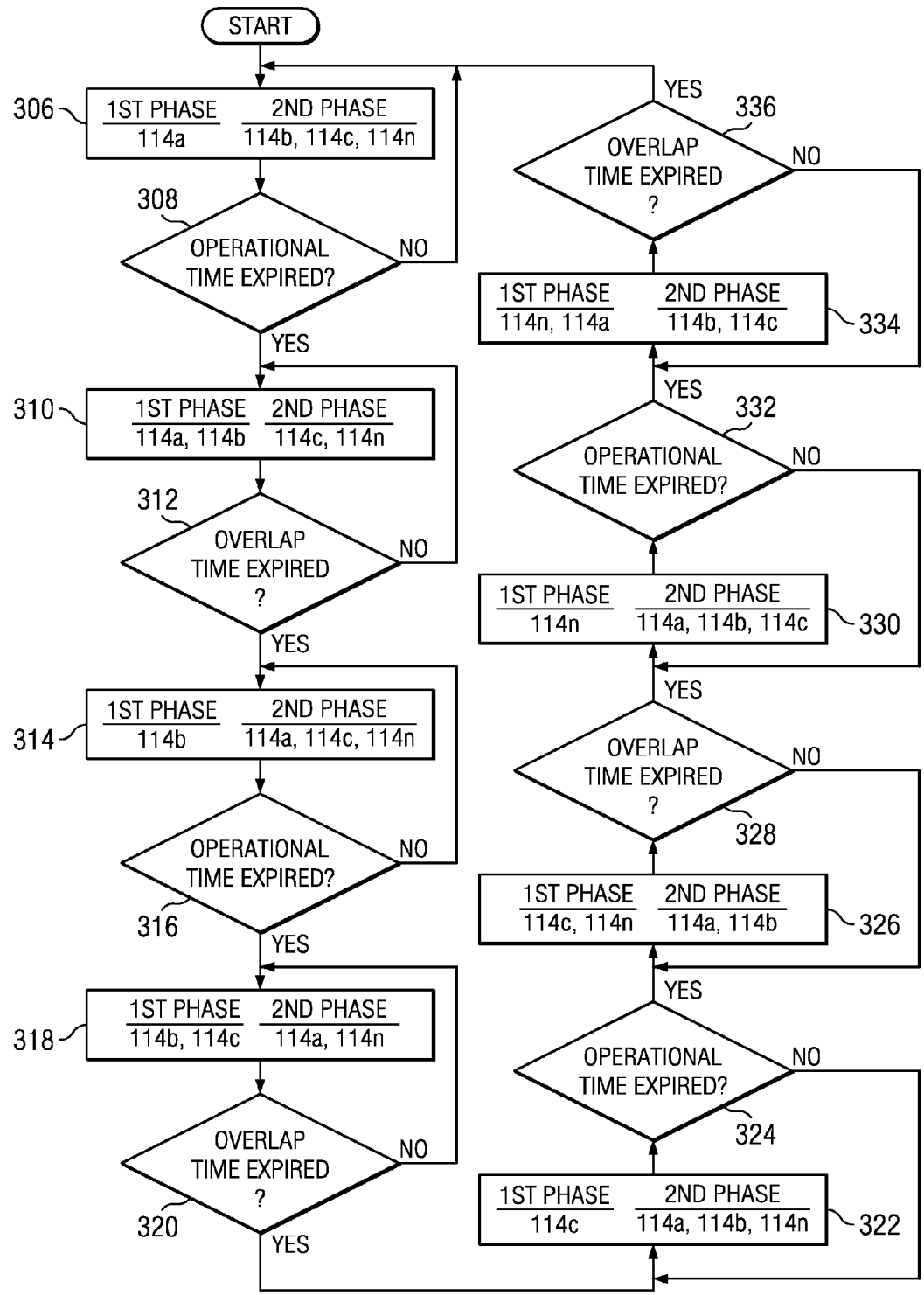
FIG. 3 illustrates a flow chart of an example method for multi-phase voltage regulation, in accordance with embodiments of the present disclosure.

Preferred embodiments and their advantages are best understood by reference to FIGS. 1-3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more busses operable to transmit communications between the various hardware components.

For the purposes of this disclosure, information handling resources may broadly refer to any component system, device or apparatus of an information handling system, including without limitation processors, busses, computer-readable media, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, a processor may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in memory and/or another component of an information handling system.

FIG. 1 illustrates a block diagram of an example of an information handling system 100 incorporating a multi-phase voltage regulator 110 in accordance with an embodiment of the present disclosure. As depicted, information handling system 100 may include a multi-phase voltage regulator 110, and one or more other information handling resources 116. Multi-phase voltage regulator 110 may include a reference voltage 118, a controller 112, and a number of phases 114. Reference voltage 118 may supply controller 112 with a target output voltage for voltage regulator 110. Controller 112 may generally control the output of voltage regulator 110 and may selectively enable or disable phases 114. Each phase 114 may supply a portion of the total current output of voltage regulator 110. Each phase 114 may include a driver 120 and a power stage 122. Driver 120 may control the operation of power stage 122. Power stage 122 may step down a supply voltage to an output voltage appropriate for information handling resources 116.

Voltage regulator 110 may comprise a plurality of phases 114. Controller 112 may designate a phase 114 as a first state phase or a second state phase. For the purposes of this disclosure, first state phase may supply electrical current regardless of the current demand on the voltage regulator 110. Controller 112 may be configured such that it does not disable a first state phase. Accordingly, a first state phase may be enabled when all second state phases are disabled. A phase 114 designated as a second state phase is a phase 114 that may supply electrical current when current demand of voltage regulator 110 is above a threshold level associated with the particular phase 114, and cease supplying electrical current when current demand of voltage regulator 110 is below the threshold level. There may be several such threshold levels whereby controller 112 may enable or disable additional phases 114.

To demonstrate the functionality of controller 112, including the enabling and/or disabling of phases 114 in response to current demand of information handling resources coupled to voltage regulator 110, the following example is provided. One phase 114 may be designated as a first state phase and all other phases 114 may be designated as second state phases. In accordance with the present example, voltage regulator 110 may comprise phases 114a, 114b, and 114c. Phase 114a may be designated as a first state phase, and phases 114b and 114c may be designated as second state phases. At a current demand at or above a first threshold level, at which all phases 114 are required to meet the current demand of information handling resources 116 coupled to voltage regulator 110, controller 112 may enable all phases 114. At a lower current demand below the first threshold level, but at or above a lower second threshold level, in which only two phases 114 are needed to meet the current demand, controller 112 may disable either of phase 114b and/or phase 114c. At a current demand below the lower second level, where only one phase 114 is required to meet the current demand, controller 112 may disable both of phases 114b and 114c, while leaving phase 114a enabled. Accordingly, to meet current demands of information handling resources 116 coupled to voltage regulator 110, controller 112 may selectively enable and/or disable phases 114b and 114c designated as second state phases, while phase 114a designated as a first state phase remains enabled regardless of current demand.

Designating a particular phase 114 as a first state phase or a second state phase may include altering any suitable characteristic of controller 112, the particular phase 114, or another component of voltage regulator 110 to indicate as a first state phase or a second state phase. For example, designating a phase 114 as a first state phase or a second state phase may include setting a variable associated with the particular phase 114 and stored in a computer-readable medium integral to controller 112, the particular phase 114, or voltage regulator 110. Controller 112 may designate a phase 114 as a first state phase before controller 112 alternates designation of another phase 114 from a first state phase to a second state phase in order to create an overlap such that two phases 114 are operating in the first state for at least a portion of time. This overlap may ensure the stability of voltage regulator 110 such that current supply is not interrupted by phase state changes.

Controller 112 may alternate a phase's state designation. Controller 112 may alternate a phase's state designation during periods of time in which voltage regulator 110 can satisfy current demand with at least one phase 114 disabled. Rather than only disable a single phase 114 for the duration of these periods, controller 112 may alternate which phase 114 or phases 114 are disabled to better distribute operational stress across phases 114. Because only phases 114 designated as second state phases may be disabled, to disable a first state phase controller 112 may alternate a second state phase to a first state phase and alternate a first state phase to a second state phase.

This rotation of phase disablement may more efficiently distribute operational stress among the phases 114 and may increase voltage regulator 110 operational lifetime. The rotation of phase disablement may also reduce operational temperature of the phases 114, which in turn may decrease thermal resistance and increase power efficiency of voltage regulator 110. Additionally, because heat from voltage regulator 110 can affect the operational temperature of other information handling resources 116 in information handling system 100, the decreased operational temperature of voltage regulator 110 may improve the operation of other information handling resources 116 and information handling system 100.

Individual phases 114 may have different power efficiencies. The amount of time a phase 114 operates as a first state phase may be determined by the phase's power efficiency. A phase 114 with higher power efficiency may operate as a first state phase longer than a phase 114 with a lower power efficiency. As an example, phase 114a of voltage regulator 110 may have the highest power efficiency, phase 114b may have the next highest power efficiency, and phase 114c may have the lowest power efficiency. In such example, phase 114a may operate as a first state phase for 3 minutes, phase 114b may operate as a first state phase for 2 minutes, and phase 114c may operate as a first state phase for 1.5 minutes.

Controller 112 may alternate a phase's state statically, whereby controller 112 alternates the phase 114's designation as a first state phase or a second state phase based on the amount of time the phase 114 has been enabled. The accumulated operating time of phases 114 may be kept by controller 112. Time may be measured by counting the clock cycles of a processor electrically coupled to the voltage regulator 110 or other suitable manner. Controller 112 may alternate the designation of individual phases 114 as first state phases and second state phases to substantially evenly distribute operating time among the phases 114. Controller 112 may also alternate the designation of individual phases 114 as first state phases and second state phases dynamically, whereby controller 112 may alternate a phase's state based at least in part on a measurement associated with voltage regulator 110, one or more phases 114, and/or an information handling resource 116 communicated to controller 112. A measurement may include temperature, electrical resistance, power efficiency, electrical current output, voltage, or other measurable parameter.

FIG. 2 illustrates an example of a phase 114 in accordance with certain embodiments of the present disclosure. Those with skill in the art will recognize various means of implementing a phase. The example in FIG. 2 shows how a phase 114 may comprise driver 120 and power stage 122.

Driver 120 may be of any system, device, or apparatus configured to drive a power stage. In one embodiment, driver 120 may function as an interface between controller 112 and power stage 122. In one embodiment, driver 120 may comprise analog circuitry and digital logic circuitry. In one embodiment, driver 120 may comprise a synchronous rectified buck metal-oxide-semiconductor field-effect transistor ("MOSFET") driver. Driver 120 may receive a pulse width modulation signal 201 from controller 112. Driver 120 may be coupled to ground 202. Driver 120 may have outputs upper gate signal 203 and lower gate signal 204. Upper gate signal 203 and lower gate signal 204 may be coupled to power stage 122.

Power stage 122 may be any system, device, or apparatus configured to regulate a voltage. In one embodiment, power stage 122 may comprise a synchronous buck converter. Power stage 122 may comprise a lower MOSFET 205 and an upper MOSFET 206. Upper gate signal 203 may be coupled to the gate of upper MOSFET 206. Lower gate signal 204 may be coupled to the gate of lower MOSFET 205. A first parasitic diode 207 may be coupled to each of the emitter and collector of upper MOSFET 206, and a lower parasitic diode 208 may be coupled to each of the emitter and collector of lower MOSFET 205. The emitter of upper MOSFET 206 may be coupled to the collector of lower MOSFET 205. A supply input voltage 217 may be coupled to the collector of upper MOSFET 206. Ground 202 may be coupled to the emitter of lower MOSFET 205. An inductor 209 may be coupled to the node of upper MOSFET 206 and lower MOSFET 205. In parallel with inductor 209, a current sense filter may be coupled in series, where the current sense filter may comprise a first resistor 210 and a first capacitor 211. The output of the inductor 209 may be coupled to a voltage output terminal 214, which may be coupled to an information handling resource 116. A second resistor 212 and a second capacitor 213 may be coupled in series with each other. The combination of second resistor 212 and second capacitor 213 may be coupled to ground 202 on one side, and on the other side may be coupled to the node of inductor 209 and voltage output 214. A first terminal 215 may be coupled to the node between second resistor 212 and second capacitor 213. A second terminal 216 may be coupled to the node between first resistor 210 and first capacitor 211.

In operation, driver 120 may receive a pulse width modulation signal 201 from the controller 112. The duty cycle of the pulse width modulation signal 201 may control the switching action of power stage 122, operating as a buck converter, by turning on and turning off upper MOSFET 206 and lower MOSFET 205 to provide a regulated output voltage to voltage output terminal 214. In a first part of a switching cycle, driver 120 may turn on upper MOSFET 206 through upper gate signal 203, and turn off lower MOSFET 205 through lower gate signal 204. When upper side MOSFET 206 is turned on, input power will be delivered from supply input voltage 217 through inductor 209 to voltage output terminal 214. In a second part of a switching cycle, driver 120 may then turn off upper MOSFET 206 through upper gate signal 203, and may turn on lower MOSFET 205 through lower gate signal 204. A current freewheeling path may be formed through lower MOSFET 208, inductor 209, and the load coupled to voltage output terminal 214. The duty cycle may be controlled properly so that the power required by the load coupled to voltage output terminal 214 needed by load is met. Current terminals 215, 216 may transmit the detected inductor current. High current terminal 215 and low current terminal 216 may be coupled to controller 112.

FIG. 3 illustrates a flow chart of an example method 300 for managing phases 114. As noted above, teachings of the present disclosure may be implemented in a variety of configurations of voltage regulator 110. As such, the preferred initialization point for method 300 and the order of the steps 306-336 comprising method 300 may depend on the implementation chosen.

The method 300 begins at step 306 with phase 114a designated as a first state phase and phases 114b, 114c, and 114n designated as second state phases. Controller 112 may maintain phase 114a as a first state phase and phases 114b, 114c, and 114n as second state phases for a particular operating time, as shown at step 308. The particular operating time may be any suitable amount of time, for example two minutes. After the operating time expires, method 300 may advance to step 310 and controller 112 may alternate the designation of phase 114b from a second state phase to a first state phase for an overlap time, as shown at step 312. The overlap time may be any suitable amount of time to ensure that current supply from voltage regulator 110 is not interrupted by a change in designation of phase 114a from a first state phase to a second state phase, for example 0.3 milliseconds. After the overlap time expires, method 300 may advance to step 314 and controller 112 may alternate the designation of phase 114a from a first state phase to a second state phase.

Controller 112 may maintain phase 114b as a first state phase for an operating time, which may be the same or different from other operating times of method 300, as shown at step 316. After an operating time expires, method 300 may advance to step 318 and controller 112 may alternate the designation of phase 114c from a second state phase to a first state phase for an overlap time, which may be the same or different from other operating times of method 300, as shown in step 320. After an overlap time expires, method 300 may advance to step 322 and controller 112 may alternate the designation of phase 114b from a first state phase to a second state phase.

Controller 112 may maintain phase 114c as a first state phase for an operating time, which may be the same or different from other operating times of method 300, as shown at step 324. After an operating time expires, method 300 may advance to step 326 and controller 112 may alternate the designation of phase 114n from a second state phase to a first state phase for an overlap time, which may be the same or different from other operating times of method 300, as shown in step 328. After an overlap time expires, method 300 may advance to step 330 and controller 112 may alternate the designation of phase 114c from a first state phase to a second state phase.

Controller 112 may maintain phase 114n as a first state phase for an operating time, which may be the same or different from other operating times of method 300, as shown at step 332. After an operating time expires, method 300 may advance to step 334 and controller 112 may alternate the designation of phase 114a from a second state phase to a first state phase for an overlap time, which may be the same or different from other operating times of method 300, as shown in step 336. After an overlap time expires, method 300 may advance to step 306 and controller 112 may alternate the designation of phase 114n from a first state phase to a second state phase.

Controller 112 may also determine at any step in method 300 that current demand has changed, requiring additional phases 114 to be configured to supply current to information handling resources 116. When the current demand returns to an appropriately low level, method 300 may begin again at its initial step or return to the step executing before the change in demand.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order. Method 300 may be implemented using voltage regulator 110 or any other system operable to implement method 300. In certain embodiments, method 300 may be implemented partially or fully in software embodied in computer-readable media.

FIG. 3 illustrates an example which utilizes static state changes whereby controller 112 alternates phase state designations based on the amount of operating time a phase 114 operates as a first state phase. The operating and/or overlap times may vary based on the requirements of information handling resources 116 supplied by voltage regulator 110 as one skilled in the art would understand. The operating and/or overlap times may also be phase-specific whereby the overlap or operating times are optimized for a particular phase 114 or phase state designation change. In some embodiments the operating and/or overlap times may be changed dynamically. For example, a phase 114 designated as a first state phase may reach a critical operating temperature whereby controller 112 adjusts the operating time for which such phase 114 operates as a first state phase.

Alternatively, it is envisioned that an overlap time may not be necessary and phase state changes could occur simultaneously, or allow periods of time in which no phase 114 is designated as a first state phase. Periods of time with no phase 114 is designated as a first state phase may be acceptable for systems with greater tolerance for interrupts in supplied current, for example where current may be supplied from alternate sources, such as charge stored in a capacitor, uninterruptible power supply, or other device. This disclosure also envisions that in some embodiments run time need not be evenly distributed across the phases 114 to derive benefit from the disclosure. This disclosure also envisions that in some embodiments only two phases 114 may alternate between designation as first state phases and second state phases.

As discussed above, controller 112 may alternate the designations of phases 114 dynamically. For example, a feedback mechanism may communicate measurements associated with phases 114, voltage regulator 110, and/or one or more of information handling resources 116 to the controller 112. As a specific example, operating and/or overlap times may be based on stimuli (e.g., measurements of temperature, electrical resistance, power efficiency, electrical current output, voltage, or other measurable parameter of the information handling system). Using temperature as an example, sensors may measure the temperature of a phase 114, and controller 112 may alternate a phase's designation as a first state phase or a second state phase at some critical temperature. The stimuli may be different for individual phases 114. In some embodiments, the stimuli may factor into an algorithm whereby multiple stimuli are evaluated.

Although the present disclosure has been described in detail, it should be understood that various changes, substitutions, and alterations can be made hereto without departing from the spirit and the scope of the invention as defined by the appended claims.

What is claimed is:

1. A multi-phase voltage regulator comprising:
  a plurality of phases comprising:
    a phase of the plurality of phases designated as a first state phase, wherein the first state phase is configured to supply a first electrical current to one or more information handling resources electrically coupled to the voltage regulator regardless of a current demand from the one or more information handling resources; and
    each phase of the plurality of phases not designated as the first state phase designated as a second state phase, wherein each second state phase is configured to supply a second electrical current to the one or more information handling resources based on the current demand;
  a controller electrically coupled to the plurality of phases and configured to selectively enable and disable the plurality of phases in response to a current demand of the one or more information handing resources such that:
    when the current demand is at or above a first threshold value, at which each phase of the plurality of phases is enabled;
    when the current demand is below the first threshold value, but at or above a second threshold value, one or more of the second states phases is disabled; and
    when the current demand is below the second threshold value, each of the second state phases is disabled.

2. The multi-phase voltage regulator of claim 1, wherein the controller is further configured to re-designated each of the plurality of phases as the first state phase or the second state phase.

3. The multi-phase voltage regulator of claim 1, the controller further configured to:
  designate a first phase of the plurality of phases as the first state phase;
  designate a second phase of the plurality of phases as the second state phase;
  re-designate the second phase as the first state phase while the first phase is designated as the first state phase; and
  re-designate the first phase as the second state phase while the second phase is designated as the first state phase.

4. The multi-phase voltage regulator of claim 1, the controller further configured to re-designate at least one of the plurality of phases as the first state phase or the second state phase based at least in part on measurements of one or more information handling resources communicated to the controller.

5. The multi-phase voltage regulator of claim 1, the controller further configured to re-designate at least one of the plurality of phases as the first state phase or the second state phase based at least in part the amount of time a phase has operated.

6. The multi-phase voltage regulator of claim 1, the controller further configured to alternate phase state designations such that there is no predefined order to the phase state designation changes.

7. An information handling system comprising:
  one or more information handling resources; and
  a multiphase voltage regulator electrically coupled to the one or more information handling resources comprising:
    a plurality of phases comprising:
      a phase of the plurality of phases designated as a first state phase, wherein each first state phase is configured to supply a first electrical current to one or more information handling resources electrically coupled to the voltage regulator regardless of a current demand from the one or more information handling resources; and
      each of the plurality of phases not designated as the first state phase designated as a second state phase, wherein each second state phase is configured to supply a second electrical current to the one or more information handling resources based on the current demand;
    a controller electrically coupled to the plurality of phases and configured to selectively enable and disable the plurality of phases in response to a current demand of the one or more information handling resources such that:
      when the current demand is at or above a first threshold value, at which each phase of the plurality of phases is enabled;
      when the current demand is below the first threshold value, but at or above a second threshold value, one or more of the second states phases is disabled; and
      when the current demand is below the second threshold value, each of the second state phases is disabled.

8. The information handling system of claim 7, wherein each of the plurality of phases is re-designated as the first state phase or the second state phase.

9. The information handling system of claim 7, the controller further configured to:
  designate a first phase of the plurality of phases as the first state phase;
  designate a second phase of the plurality of phases as the second state phase;
  re-designate the second phase as the first state phase while the first phase is designated as the first state phase; and
  re-designate the first phase as the second state phase while the second phase is designated as the first state phase.

10. The information handling system of claim 7, the controller further configured to re-designate at least one of the plurality of phases as the first state phase or the second state phase based at least in part on measurements of one or more information handling resources communicated to the controller.

11. The information handling system of claim 7, the controller further configured to re-designate at least one of the plurality of phases as the first state phase or the second state phase based at least in part the amount of time a phase has operated.

12. The information handling system of claim 7, the controller further configured to alternate phase state designations such that there is no predefined order to the phase state designation changes.

13. A method for regulating voltage comprising:
electrically coupling one or more information handling resources to a multi-phase voltage regulator comprising:
designating a phase of the plurality of phases as a first state phase, wherein each first state phase is configured to supply a first electrical current to one or more information handling resources electrically coupled to the voltage regulator regardless of a current demand from the one or more information handling resources; and
designating each of the plurality of phases not designated as the first state phase as a second state phase, wherein each second state phase is configured to supply a second electrical current to the one or more information handling resources based on the current demand;
selectively enabling and disabling the plurality of phases in response to a current demand of the one or more information handing resources such that:
when the current demand is at or above a first threshold value, at which each phase of the plurality of phases is enabled;
when the current demand is below the first threshold value, but at or above a second threshold value, one or more of the second states phases is disabled; and
when the current demand is below the second threshold value, each of the second state phases is disabled.

14. The method of claim 13, wherein each of the plurality of phases is re-designated as the first state phase or the second state phase.

15. The method of claim 13, the controller further configured to:
designate a first phase of the plurality of phases as the first state phase;
designate a second phase of the plurality of phases as the second state phase;
re-designate the second phase as the first state phase while the first phase is designated as the first state phase; and
re-designate the first phase as the second state phase while the second phase is designated as the first state phase.

16. The method of claim 13, the controller further configured to re-designate at least one of the plurality of phases as the first state phase or the second state phase based at least in part on measurements of one or more information handling resources communicated to the controller.

17. The method of claim 13, the controller further configured to re-designate at least one of the plurality of phases as the first state phase or the second state phase based at least in part the amount of time a phase has operated.

\* \* \* \* \*